United States Patent
Miyanaga

[11] 3,854,840
[45] Dec. 17, 1974

[54] CORE DRILL

[76] Inventor: Masaaki Miyanaga, 5-15-109 Matsuhamacho, Ashiya, Japan

[22] Filed: Feb. 15, 1974

[21] Appl. No.: 442,903

[52] U.S. Cl............ 408/204, 144/23, 408/208
[51] Int. Cl............................................ B23b 51/04
[58] Field of Search ......... 408/204, 232, 205, 206, 408/207, 208, 209, 713; 279/2; 144/20–24

[56] References Cited
UNITED STATES PATENTS

| | | | |
|---|---|---|---|
| 1,467,406 | 9/1923 | Walker | 408/204 X |
| 2,482,439 | 9/1949 | Smith | 279/2 X |
| 2,674,026 | 4/1954 | Palley | 408/204 X |

Primary Examiner—Andrew R. Juhasz
Assistant Examiner—Z. R. Bilinsky
Attorney, Agent, or Firm—Wenderoth, Lind & Ponack

[57] ABSTRACT

A core drill has a fixed disk and a movable disk within the drilling cylinder. Both disks are tapered at their periphery and a tension ring is placed around the peripheries. The drilling cylinder is driven through the ring and the disks. A center drill is provided in the drilling cylinder for centering prior to the drilling with said cylinder.

3 Claims, 8 Drawing Figures

PATENTED DEC 17 1974 3,854,840
SHEET 2 OF 2
FIG. 5    FIG. 4
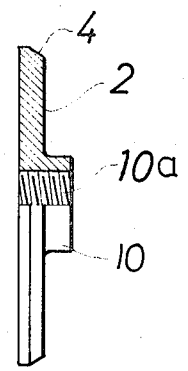
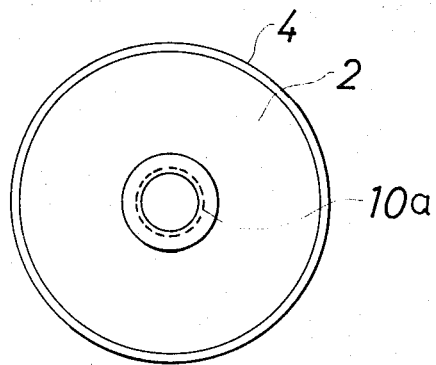
FIG. 7    FIG. 6
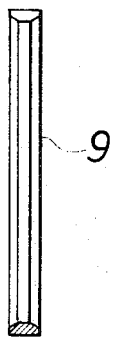
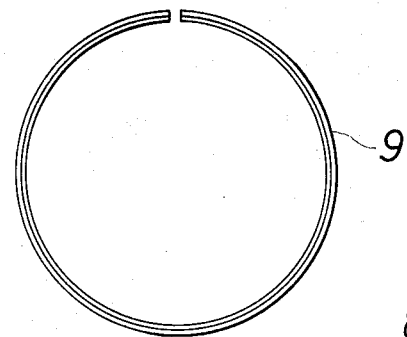
FIG. 8
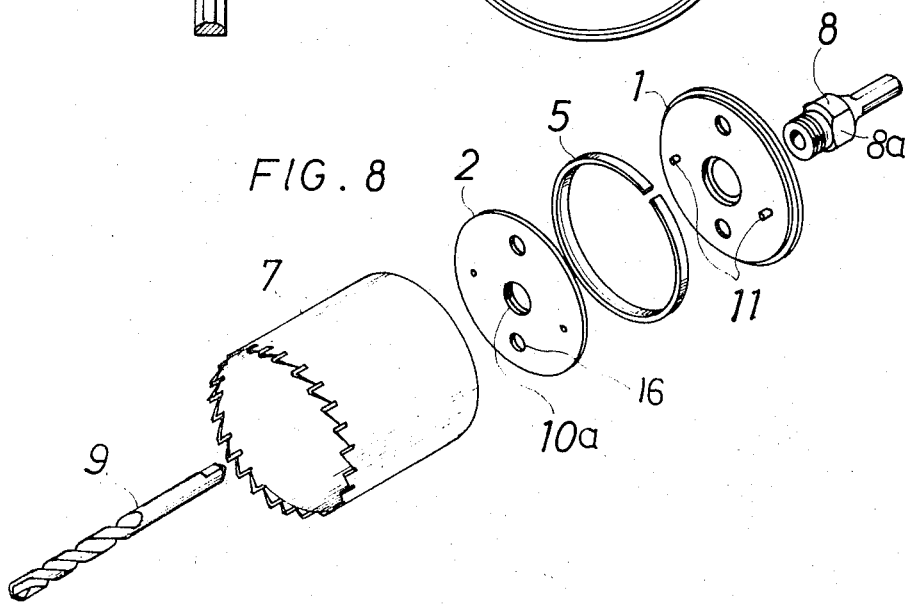

CORE DRILL

SUMMARY OF THE INVENTION

The present invention relates to a core drill which is used for a large bore drilling of mortar, timber, bamboo, Japanese-style walls, plywood, concrete, slate and the like.

An object of the present invention is to provide a core drill which can drill large holes quickly and accurately and with excellent finishing for installing such items as piping and power distribution conduits in buildings, civil engineering projects, aqueducts and other structures.

Another object is to provide a core drill which can be assembled and disassembled easily and which has a drilling cylinder, a fixed and a movable disk and a tension ring, which make the drill usable either in a rotation drilling system or a vibration drilling system.

These objects are achieved by the core drill of the present invention which has a shank having a drill receiving recess in the lower end thereof, a shoulder thereon and a threaded portion between said shoulder and said lower end. A fixed disk is positioned around said shank between said shoulder and said threaded portion and against said shoulder, and a movable disk is threaded on said threaded portion. The disks have tapered edge portions on the peripheral edges thereof which taper toward each other, and a split ring having a cross-section with tapered edges engages said tapered edge portions. A drilling cylinder is positioned around said ring with the inside surface of the drilling cylinder closely fitted to the outer surface of said ring. When the core drill is driven, the movable disk is moved toward the fixed disk to spread the split ring outwardly into tight driving engagement with the drilling cylinder.

These and other objects will become clear from the following description taken in connection with the accompanying drawings:

BRIEF DESCRIPTION OF THE DRAWINGS

FIG. 4 is a front elevational view of the movable disk of the drill of FIG. 1;

FIG. 5 is a side view, partially in section, of the disk of FIG. 4;

FIG. 6 is a front elevational view of the tension ring of the drill of FIG. 1;

FIG. 7 is a vertical sectional view of the ring of FIG. 6; and

FIG. 8 is a perspective view showing the drill disassembled.

DETAILED DESCRIPTION OF THE INVENTION

Figure 1:
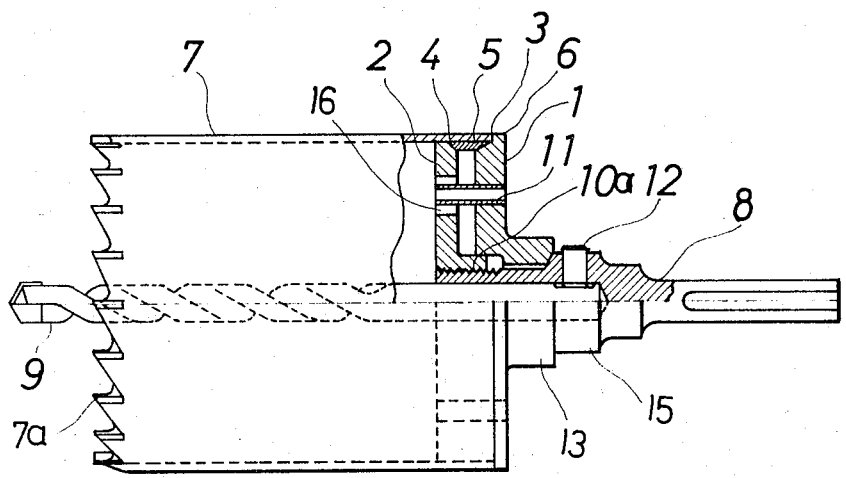
FIG. 1 is a side view, partially in section, of the core drill of the invention.
Figure 3:
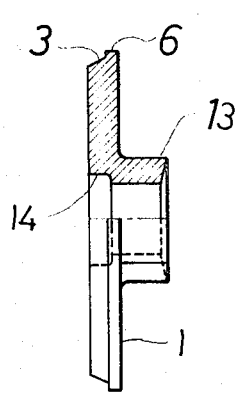
FIG. 3 is a side view, partially in section, of the disk of FIG. 2.
Figure 2:
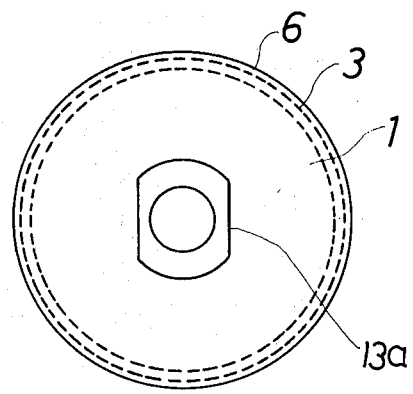
FIG. 2 is a front elevational view of the fixed disk of the drill of FIG. 1.

The core drill of the present invention is comprised of a fixed disk 1 and a coaxial movable disk 2. The outer peripheral edges of disks 1 and 2 have tapered faces 3 and 4 which taper toward each other like portions of the sides of a V-shaped groove. A split tension ring 5, which is freely expandable and contractable, has a truncated triangular cross-section the sides of which taper complementarily to said tapered faces 3 and 4, and the ring 5 is fitted tightly on said tapered peripheral edge faces. A drilling cylinder 7 having teeth 7a on the lower end thereof is fitted closely around the outside peripheral surface of the ring 5 and the upper edge thereof is abutted against an outer flange 6 extending radially outwardly from the peripheral edge of the fixed disk 1. A shank 8, having a center drill 9 held in the center recess thereof by a set pin 12, extends through a collar 13 on the inner periphery of the fixed disk 1 and threads into threads 10a on the interior of the collar 10 on the movable disk 2. Collar 10 is slidable inside a recess 14 in disk 1 below collar 13, and collar 13 and thus disk 2 is movable toward disk 1 as collar 10 moves into the recess 14 as collar 13 on disk 1 abuts against an enlargement 15 on the shank 8.

The fixed disk 1 further has split pins 11, or spring cotters or the like, extending therefrom into holes 16 in the movable disk 2 which are larger than the pins 11, so that there can be some relative rotational movement between the disks and some movement of disk 2 toward disk 1.

By this structure the tension ring 5 is sandwiched and held between the fixed disk 1 and the movable disk 2, and the outer periphery of the ring is covered by the drilling cylinder 7.

In operation, a shank 8 is manually rotated clockwise to thread into threads 10a of disk 2 while disk 1 is prevented from rotating likewise by holding collar 13 of disk 1 coupled to disk 2 with pins 11, preferably by clamping flat portion 13a of collar 13 with a wrench. Enlargement 15 of shank 8 presses collar 13 to force disk 1 toward disk 2; tapered faces 3 and 4 of the disks pressing tension ring 5 radially outward, into a tight engagement with drilling cylinder 7 by the final turn with a wrench clamping flat portion 8a as seen in FIG. 8 of shank 8. Thus, the rotating motion of shank 8 is transmitted to drilling cylinder 7.

When carrying out drilling using the core drill in accordance with this invention, the operation procedure is as follows:

While driving the drill and securely controlling the drilling position, the drilling work is started and the drilling position is accurately located by placing the tin of the center drill 9 on the center of the bore to be drilled.

The secure engagement between shank 8 and cylinder 7 is positively maintained by the high-speed rotation of shank 8 relative to the disks and the cylinder, the rotational speed of which is lowered as teeth 7a acts on the material being drilled. Thus a bore having the same diameter of that of the drilling cylinder 7 is quickly and accurately drilled through.

It will be understood that the drill is easily disassembled by rotating shank 8 counterclockwise while holding collar 13.

According to the present invention, free selection of uses of the drill becomes possible because various drills and drilling cylinders can be substituted for each other, so that the drill can be used not only for various purposes, but maintenance and cleaning thereof is easily carried out and the working efficiency is improved. Moreover, since maintenance and repair of the whole system is easily done by exchanging only one component which has been damaged or worn out, it is not necessary to scrap the whole system, thus prolonging the service life thereof.

As described above, the core drill in accordance with this invention is a very economical device and a superior and advanced technical invention contributing to the building industries.

What is claimed is:

1. A core drill comprising a shank having a drill receiving recess in the lower end thereof, a shoulder thereon and a threaded portion between said shoulder and said lower end, a fixed disk around said shank between said shoulder and said threaded portion and against said shoulder, a movable disk threaded on said threaded portion, said disks having tapered edge portions on the peripheral edges thereof which taper toward each other, a split ring having a cross-section with tapered edges engaging said tapered edge portions, and a drilling cylinder around said ring with the inside surface of the drilling cylinder closely fitted to the outer surface of said ring.

2. A core drill as claimed in claim 1 in which said fixed disk has a flange extending radially outwardly from the peripheral edge thereof against which the end of the drilling cylinder abuts.

3. A core drill as claimed in claim 1 in which said fixed disk has a collar thereon around said shank and abutting said shoulder and a recess in the face thereof toward said movable disk and around said shank, and said movable disk has a collar thereon around said shank which is movable in said recess.

* * * * *